United States Patent [19]
Koriyama

[11] Patent Number: 5,629,820
[45] Date of Patent: May 13, 1997

[54] STRUCTURE FOR SUPPORTING HEAD SUSPENSION OF ACTUATOR OF MAGNETIC DISK DRIVE

[75] Inventor: Hiroshi Koriyama, Tokyo, Japan

[73] Assignee: NEC Corporation, Tokyo, Japan

[21] Appl. No.: 204,804

[22] Filed: Mar. 2, 1994

Related U.S. Application Data

[63] Continuation of Ser. No. 833,028, Feb. 10, 1992, abandoned.

[30] Foreign Application Priority Data

Feb. 8, 1991 [JP] Japan ................... 3-037900

[51] Int. Cl.$^6$ ............... G11B 5/48; G11B 21/16; G11B 33/14
[52] U.S. Cl. .................. 360/104; 360/97.02
[58] Field of Search .................. 360/97.02, 104, 360/105, 106, 98.07, 97.01

[56] References Cited

U.S. PATENT DOCUMENTS

| | | | |
|---|---|---|---|
| 3,723,980 | 3/1973 | Gabor | 360/97.02 |
| 4,821,130 | 4/1989 | Bernett et al. | 360/106 |
| 4,860,135 | 8/1989 | Cain | 360/106 |
| 4,945,432 | 7/1990 | Matsudaira et al. | 360/98.02 |
| 4,994,931 | 2/1991 | Foote | 360/106 |
| 5,027,242 | 6/1991 | Nishida et al. | 360/105 |
| 5,184,265 | 2/1993 | Foote et al. | 360/104 |
| 5,283,704 | 2/1994 | Reidenbach | 360/104 |

FOREIGN PATENT DOCUMENTS 02083866  3/1990  Japan.

Primary Examiner—Stuart S. Levy
Assistant Examiner—David D. Davis
Attorney, Agent, or Firm—Sughrue, Mion, Zinn, Macpeak & Seas

[57] ABSTRACT

A magnetic disk drive is disclosed which has head sliders constituting a magnetic head and pressed against magnetic disks which are rotatable at high speed. The head sliders are made up of data head sliders for writing and reading data out of the disks and servo head sliders for positioning the data head sliders. The head sliders are each affixed to a gimbal spring which is in turn affixed to a load spring. Each load spring is directly affixed to the spacers at the other end thereof. The spacers are made of the same material as the load springs or made of at least two different materials.

4 Claims, 7 Drawing Sheets

STRUCTURE FOR SUPPORTING HEAD SUSPENSION OF ACTUATOR OF MAGNETIC DISK DRIVE

This is a continuation of application Ser. No. 07/833,028 filed Feb. 10, 1992, now abandoned.

BACKGROUND OF THE INVENTION

The present invention relates to a magnetic disk drive substantially free from an off-track problem ascribable to varying ambient temperature.

Electronic apparatuses including computers and word processors write and read data out of recording media by use of various kinds of magnetic recording/reproducing or magnetic recording implementations. Among them, a magnetic disk drive operable with a magnetic disk usually includes a rotary carriage on which a magnetic head is mounted in such a manner as to face the opposite sides of magnetic disks. As the disks are rotated at high speed, the head is moved away from the surfaces of the disks by a small distance by the resulting pneumatic pressure to thereby magnetically write or read data in or out of the disks. The head is made up of data heads for the write-in and read-out of data and servo heads for positioning the data heads. Specifically, the carriage reads a positioning pattern stored in the disks by the servo heads to thereby position the data heads. A current trend in the magnetic recording and playback art is toward a magnetic disk drive having a greater capacity. To increase the capacity of a disk drive, it is necessary to increase the recording density by increasing either the bit density or the track density. The track width available today is as small as 15 microns.

Generally, an electronic apparatus using a magnetic disk drive is used under varying ambient conditions, especially varying ambient temperature. It follows that the various members constituting the disk drive and each having a particular coefficient of thermal expansion deform in different manners in response to a change in ambient temperature. Then, the data heads positioned by the servo heads are deviated from the target tracks, i.e., go off-track, failing to read data out of the tracks of interest.

SUMMARY OF THE INVENTION

It is, therefore, an object of the present invention to provide a magnetic disk drive which allows a minimum of off-track to occur even when the ambient temperature undergoes a noticeable change.

In accordance with the present invention, a magnetic disk drive for writing and reading data out of magnetic disks comprises a magnetic head comprising data head sliders facing the faces of the magnetic disks for writing and reading data thereoutof, and servo head sliders for positioning the data head sliders, gimbal springs each having a tongue for supporting one of the data head sliders and servo head sliders, load springs each carrying one of the gimbal springs at one end thereof for urging the gimbal spring against the adjoining face of one of the disks, and spacers affixing the other end of the load springs directly thereto and stacked together with the other end of the load springs.

Also, in accordance with the present invention, a magnetic disk drive for writing and reading data out of magnetic disks comprises a magnetic head comprising data head sliders facing opposite faces of the magnetic disks for writing and reading data thereoutof, and servo head sliders for positioning the data head sliders, load springs each carrying one of the data head sliders and servo head sliders at one end thereof for urging it against the adjoining face of one of the disks, and spacers affixing the other end of the load springs directly thereto and stacked together with the other end of the load springs.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
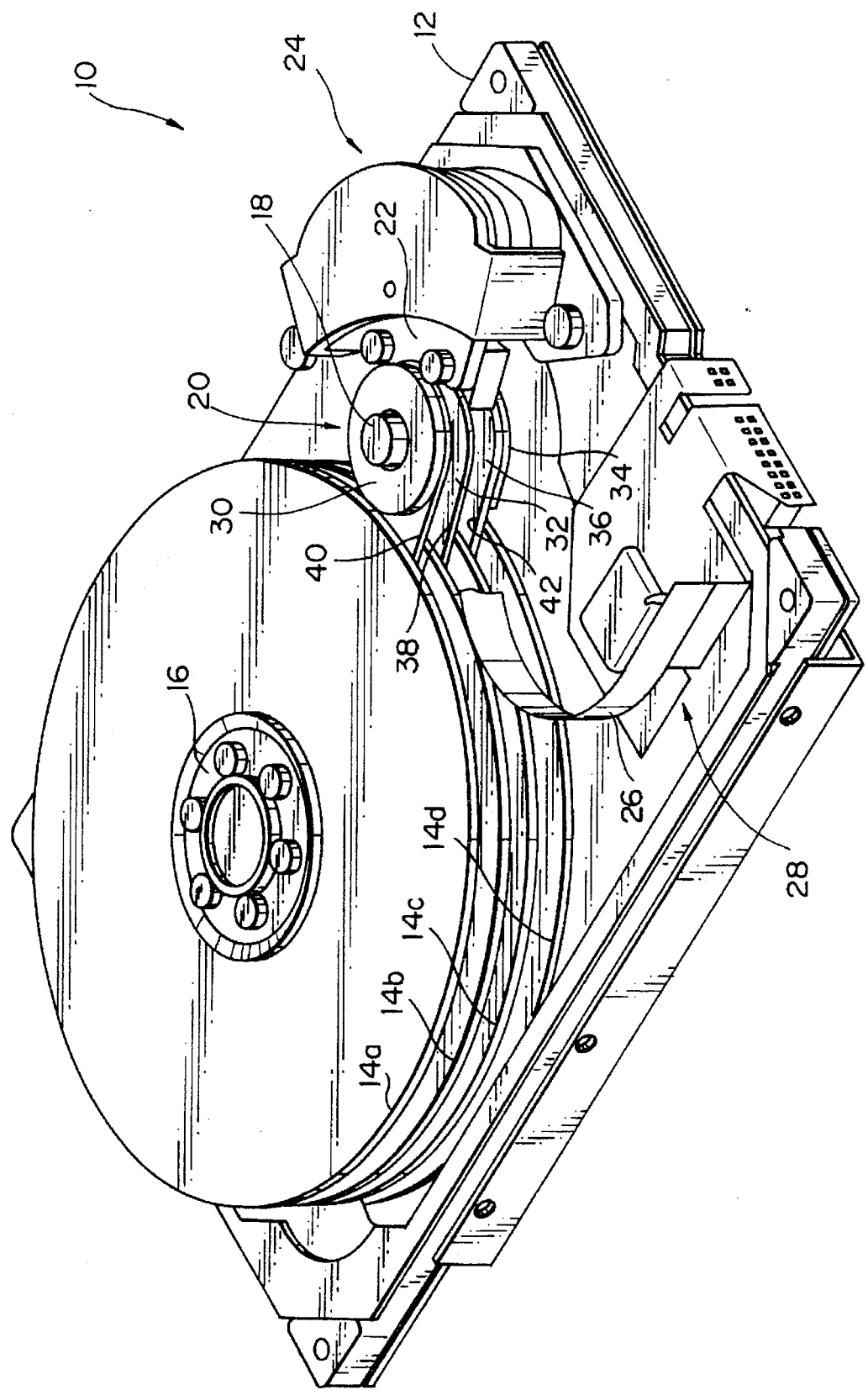
FIG. 1 is a perspective view of a conventional magnetic disk drive.

To better understand the present invention, a brief reference will be made to a conventional magnetic disk drive, shown in FIG. 1. As shown, the disk drive, generally 10, has a base 12 on which a spindle 16 is mounted. The spindle 16 is rotated by a motor, not shown, to in turn rotate four magnetic disks 14a–14d which are disposed one above another at predetermined intervals. A rotary carriage 20 is rotatably mounted on a shaft 18 which is also mounted on the base 12. The rotary carriage 20 brings head sliders, FIG. 2, constituting a magnetic head into contact with the faces of associated disks 14a–14d under predetermined pressure and causes the former to move across the tracks of the latter. A magnetic circuit 24 is arranged on the base 12 and includes a flat coil 22. An electric circuit 28 is also arranged on the base 12 and connected by a flat cable 26 to electromagnetic transducers, not shown, which are built in the respective head sliders.

Figure 2:
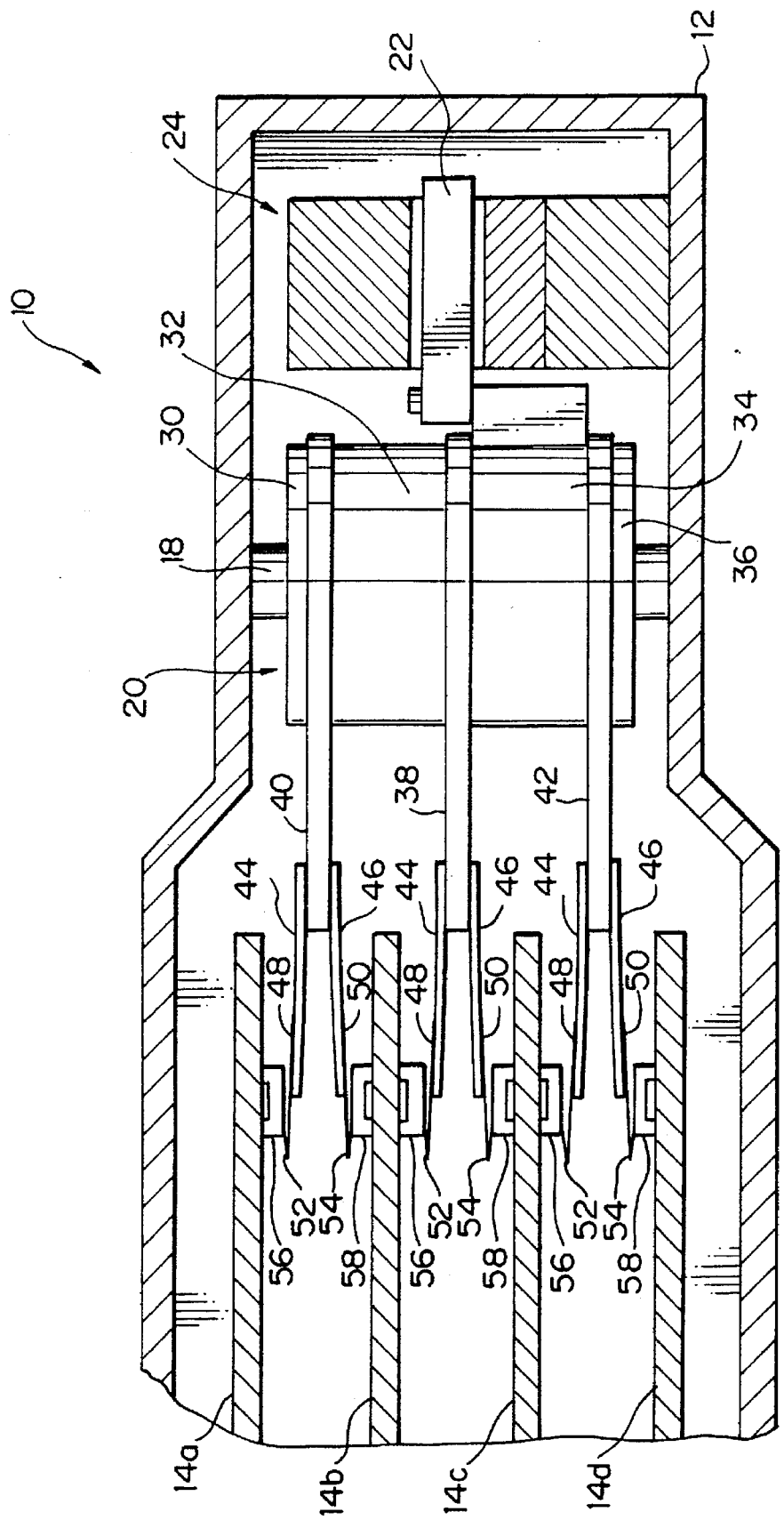
FIG. 2 is a fragmentary section of the disk drive shown in FIG. 1.

As shown in FIGS. 1 and 2, the rotary carriage 20 has four spacers 30, 32, 34 and 36 each having a hole at the center thereof through which the shaft 18 extends. An arm 38 is interposed between the spacers 32 and 34 and has a through hole at one end thereof through which the shaft 18 extends, so that the arm 38 is rotatable relative to the shaft 18. Likewise, an arm 40 is interposed between the spacers 30 and 32 and rotatably mounted on the shaft 18 through a hole formed at one end thereof. Further, an arm 42 is interposed between the spacers 34 and 36 and rotatably mounted on the shaft 18 through a hole formed at one end thereof. As shown in FIG. 2, load springs 44 and 46 are affixed at one end thereof to the other end of each of the arms 38–42 while gimbal springs 48 and 50 are affixed to the other end of the load springs 44 and 46, respectively. Tongues 52 and 54 extend out from the center of the gimbal springs 48 and 50, respectively. Head sliders 56 and 58 are affixed to the tongues 52 and 54, respectively, and each constitutes part of a magnetic head. The head sliders 56 and 58 associated with the arm 38 are servo head sliders for positioning the head while the head sliders 56 and 58 associated with the arms 40 and 42 are data head sliders for writing and reading data. The head sliders 56 and 58 are each pressed against the surface of adjoining one of the disks 14a–16a by one of the load springs 44 and 46. As the magnetic disks 14a–16a are rotated at high speed, the head sliders 56 and 58 are moved away from the respective disk faces by a small distance due to the resulting pneumatic pressure.

Generally, an electronic apparatus using the above-described magnetic disk drive 10 is used under varying ambient conditions, especially varying ambient temperature. It follows that the various members constituting the disk drive 10 and each having a particular coefficient of thermal expansion deform in different manners in response to a change in ambient temperature. Then, the data heads positioned by the servo heads are deviated from the target tracks, go off-track, failing to read data out of the tracks of interest. This is especially true with the members constituting the rotary carriage 20, i.e., arms 38–42, load springs 44 and 46, and gimbal springs 48 and 50. Once such components of the rotary carriage 20 deform in different ways due to the varying ambient temperature, the relative position of the data head sliders 56 and 58 and the servo head sliders 56 and 58 changes to bring about so-called thermal off-track. Generally, the head springs 44 and 46 are made of chrome steel (SUS class as prescribed by JIS (Japanese Industrial Standards) ) having a coefficient of linear expansion of $17.3 \times 10^{-6}/°$ C. On the other hand, the arms 38–42 are usually made of aluminum having a coefficient of linear expansion of $23.8 \times 10^{-6}/°$ C. Therefore, when the arms 38–40 each has a different coefficient of linear expansion or when the bonding strength between the load springs 44 and 46 and the arms 38–40 is not uniform, the above-stated thermal off-track problem becomes serious.

Figure 3:
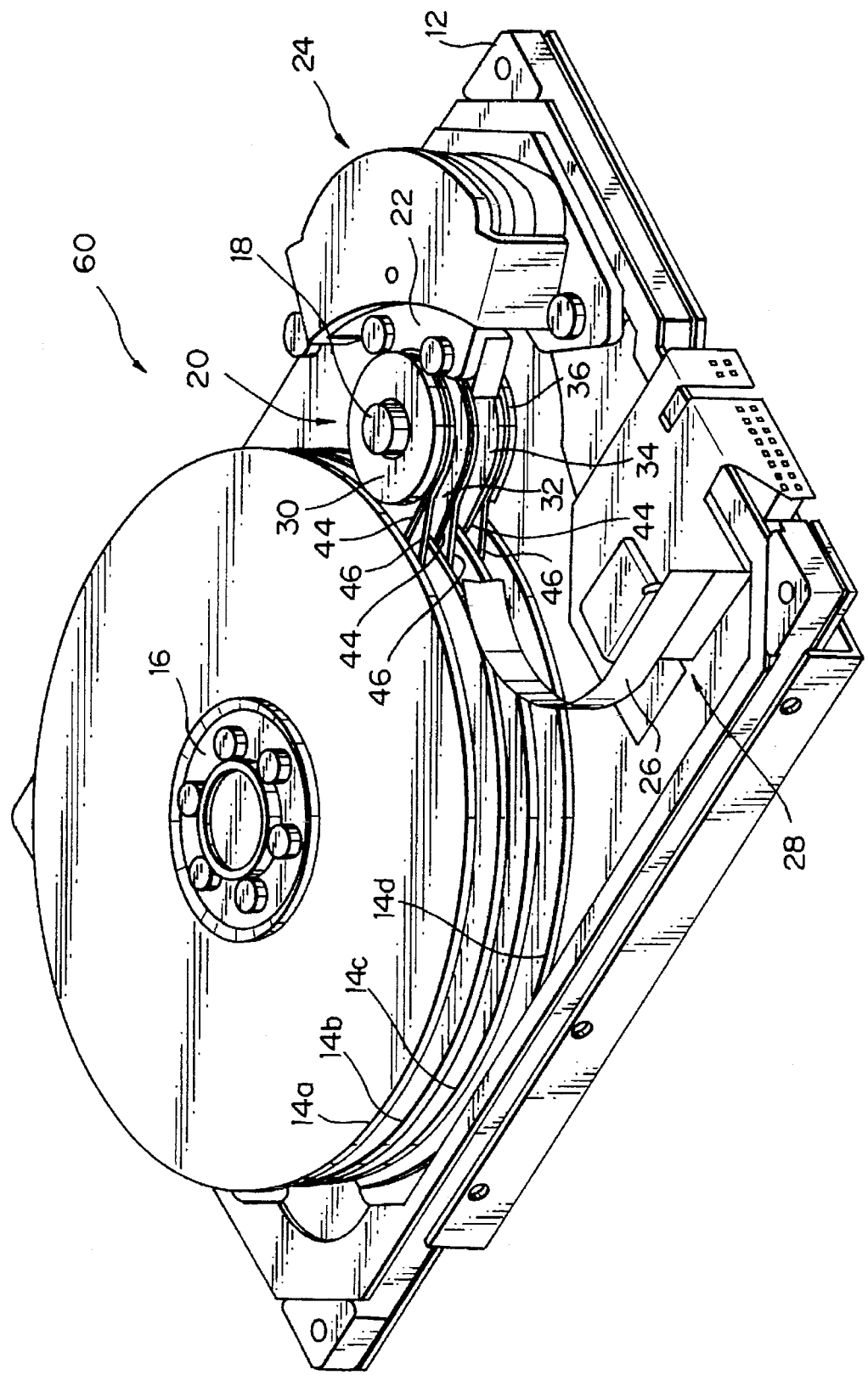
FIG. 3 is a perspective view of a magnetic disk drive embodying the present invention.
Figure 4:
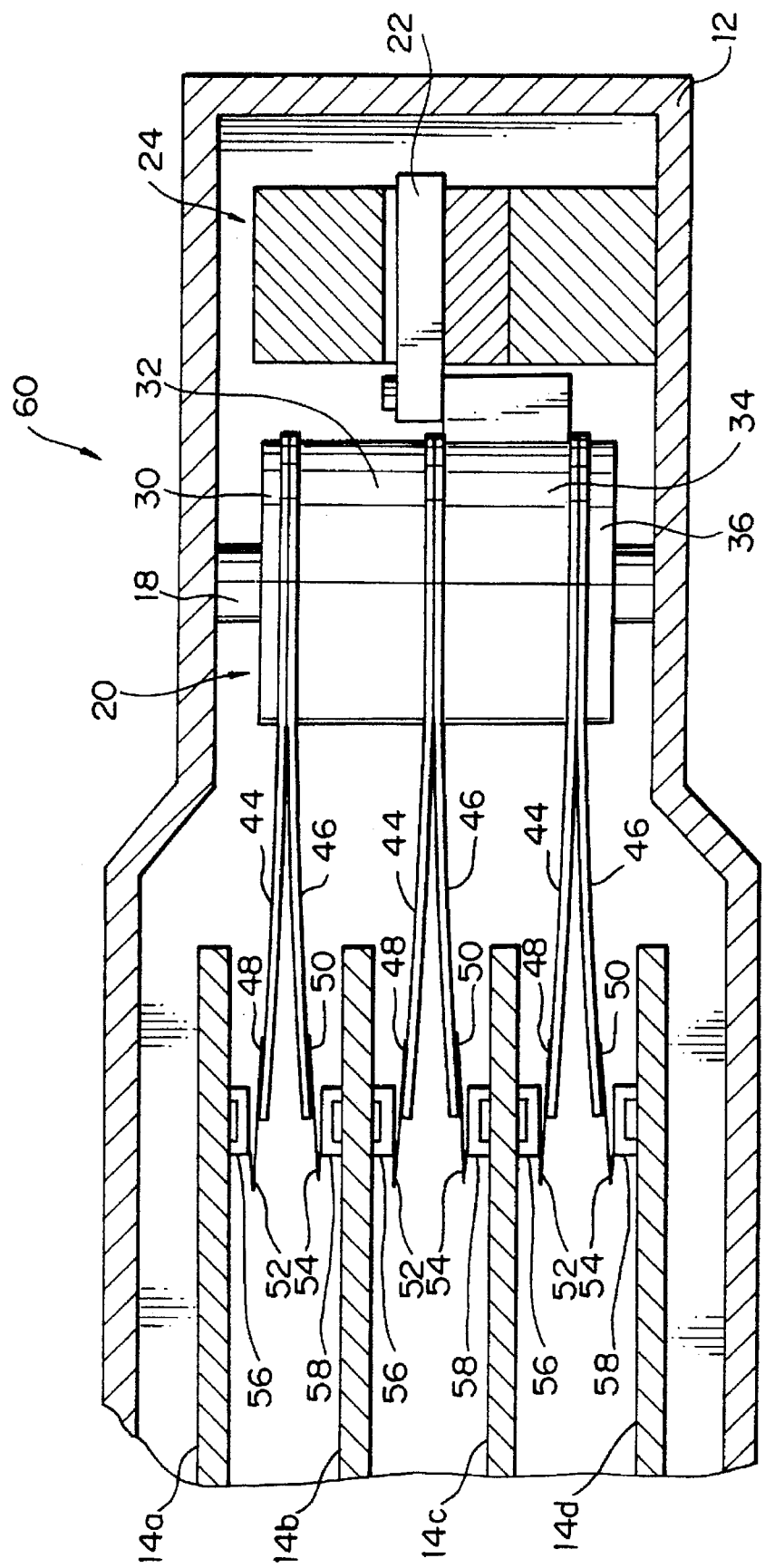
FIG. 4 is a fragmentary section of the embodiment shown in FIG. 3.

Referring to FIGS. 3 and 4, a magnetic disk drive embodying the present invention is shown. In the figures, the same parts and elements are designated by the same reference numerals, and redundant description will be avoided for simplicity. As shown, the magnetic disk drive, generally 60, is different from the conventional disk drive 10 in that load springs 44 and 46 carrying respectively the gimbal springs 48 and 50 at on end thereof are directly connected to spacers 30, 32, 34 and 36 at the other end thereof. Specifically, the load springs 44 and 46 are each bent a predetermined angle toward associated one of magnetic disks 14a–16d. The load springs 44 and 46 with such a configuration are stacked at the ends thereof remote from the gimbal springs 48 and 50 and fixed in place by the spacers 30, 32, 34 and 36 at predetermined intervals. When the temperature around the disk drive 60 changes, the gimbal springs 48 and 50 and the load springs 44 and 46 deform due to thermal expansion. However, since the load springs 44 and 46 are directly affixed to the spacers 30–36 and made of the previously mentioned SUS class material having a small coefficient of thermal expansion, the relative position of the data head sliders 56 and 58 and servo head sliders 56 and 58 changes little and, therefore, allows a minimum of thermal off-track to occur. In addition, since the disk drive 60 does not have the conventional arms 38, 40 and 42 and stacks only the load springs 44 and 46 which are extremely thin, it does not increase the moment of inertia and is easy to assemble.

If desired, the spacers 30–36 may be made of the same SUS class material as the load springs 44 and 46. It has been customary to select aluminum or magnesium for the spacers. This is undesirable since the change in ambient temperature causes thermal distortion to occur in the positions where such spacers adjoin the load springs which are made of a different material, resulting in some thermal off-track.

Alternatively, among the spacers 30–36, only the lowermost spacer 36 may be made of a SUS material while the others may be made of aluminum. Then, when the thermal off-track of the uppermost head slider 56 or the lowermost head slider 58 is noticeable, it can be corrected by the thermal distortion of the spacers 30–36 and load springs 44 and 46.

Figure 5:
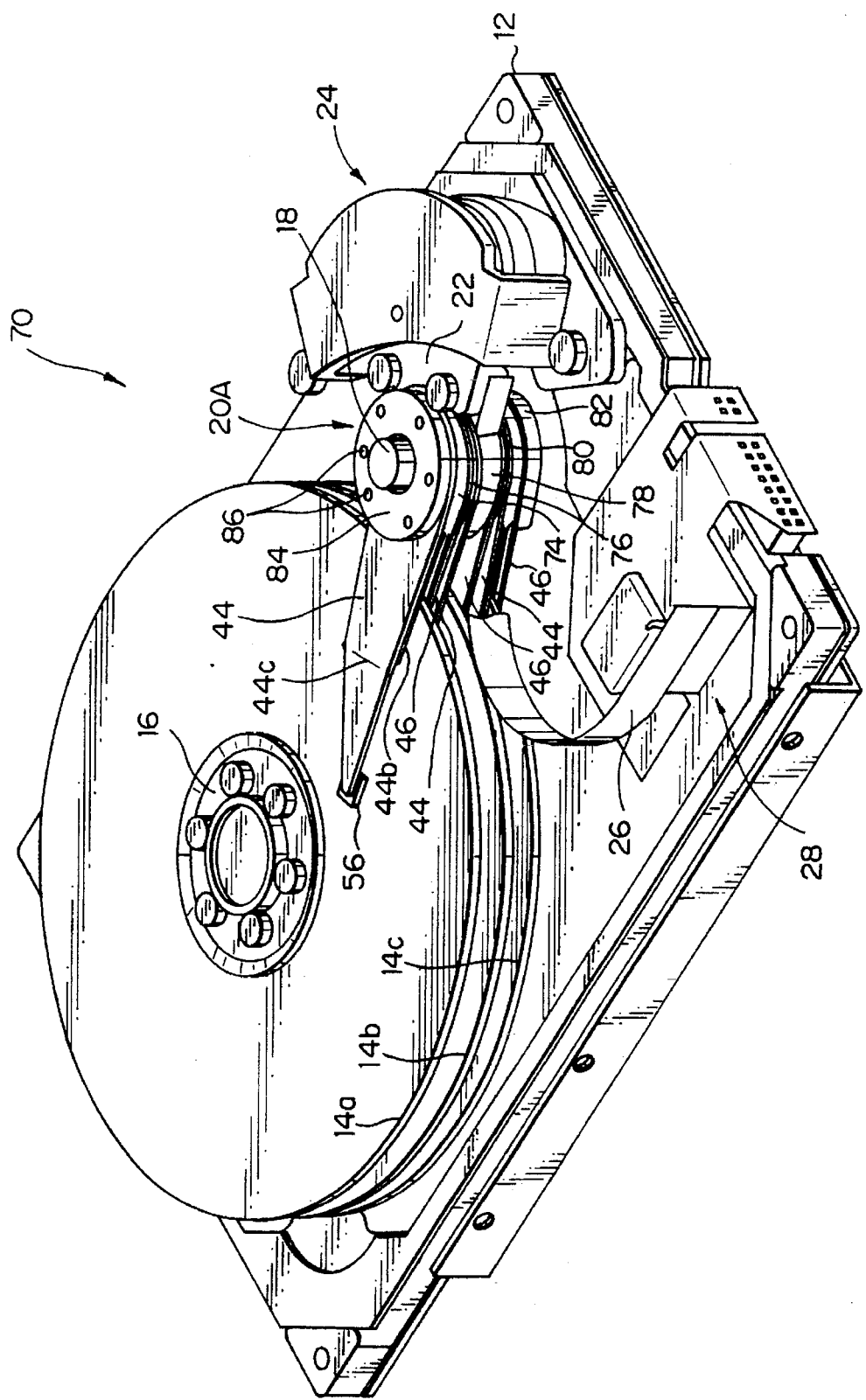
FIG. 5 is a perspective view showing an alternative embodiment of the present invention.
Figure 6:
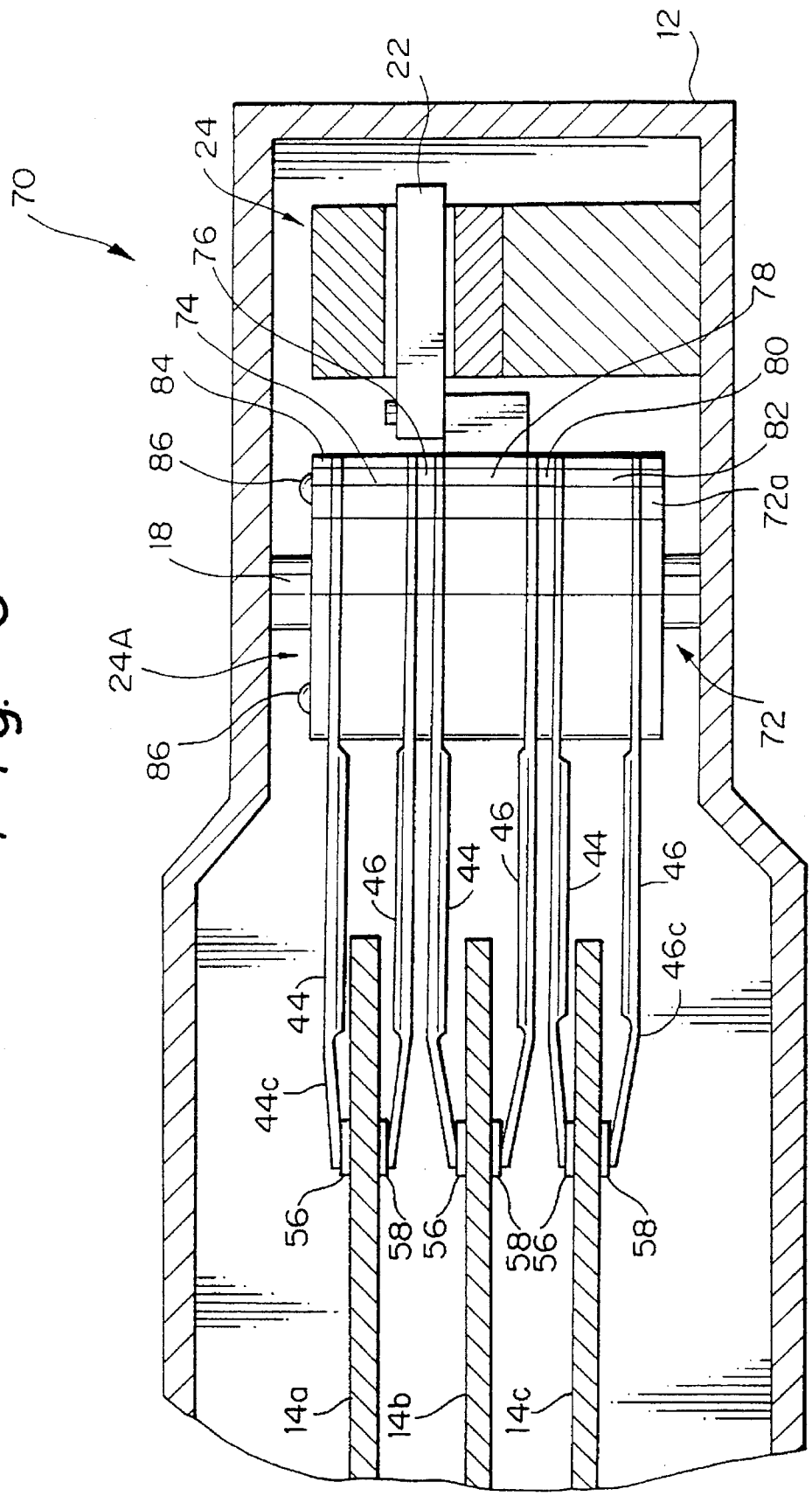
FIG. 6 is a fragmentary section of the alternative embodiment.
Figure 7:
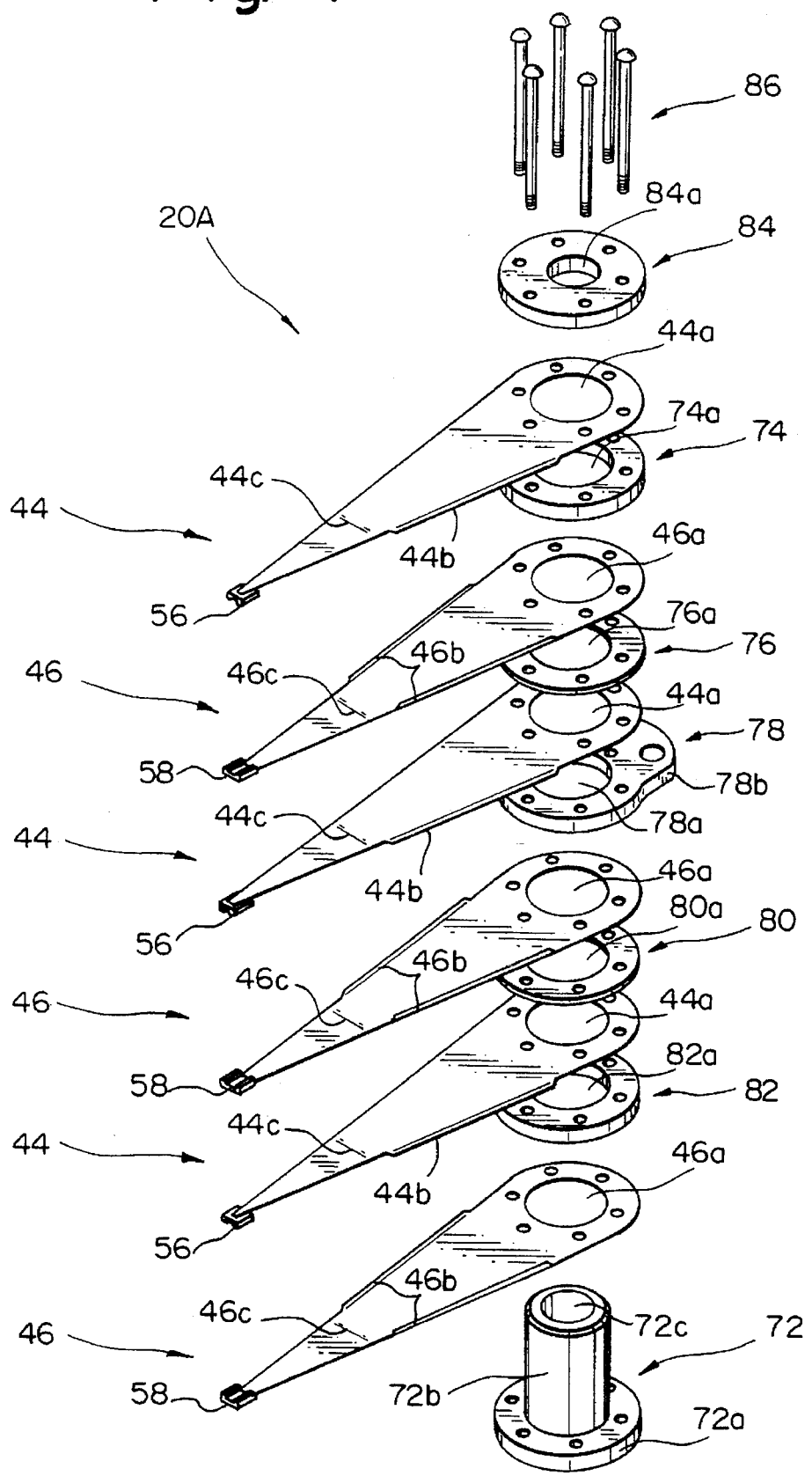
FIG. 7 is an exploded perspective view of the disk drive shown in FIG. 5.

Referring to FIGS. 5–7, an alternative embodiment of the present invention is shown. In the figures, the same parts and elements are designated by the same reference numerals, and redundant description will be avoided for simplicity. As shown, a magnetic disk drive, generally 70, also lacks the arms of the conventional disk drive 10 and affixes the load springs 44 and 46 directly to the spacers of the rotary carriage. Specifically, a rotary carriage 20A has a base in the form of a cylinder 72. The cylinder 72 has a bottom portion 72a formed with a plurality of threaded holes, a columnar cylindrical portion 72b extending vertically from the bottom portion 72a, and a through hole 72c extending throughout the center of the cylindrical portion 72b and that of the bottom portion 72a. Bearings are disposed in the through hole 72c and coupled over the shaft 18. The load springs 44 and 46 have respectively holes 44a and 46a at one end thereof and have flanges 44b and 46b, respectively. Spacers 74, 76, 78, 80 and 82 have respectively holes 74a, 76a, 78a, 80a and 82a at the center thereof. The load springs 44 and 46 and spacers 74–82 are sequentially stacked on the cylinder 72 with their aligned holes receiving the cylindrical portion 72b. A clamper 84 has a hole 84a and is mounted on the top of such a stack. A plurality of screw holes are formed in each of the load springs 44 and 46, spacers 74–82, and clamper 84 in alignment with the threaded holes of the bottom portion 72a of the cylinder 72. Screws 86 are driven into the aligned screw holes and threaded holes to fasten the stacked members to the cylinder 72. The spacers 74–82 and the load springs 44 and 46 may be connected together by adhesive, if desired. In the illustrative embodiment, the load springs 44 and 46 have respectively bent portions 44c and 46c for urging the associated sliders 56 and 58 against the disk face. The spacers 74, 78 and 82 are comparatively thick, and the spacers 76 and 80 are comparatively thin. Therefore, the head sliders 56 and 58 affixed to the load springs 44 and 46 which hold one of the comparatively thick spacers 74, 78 and 82 therebetween face each other and contact the opposite faces of the associated disk. Among the comparatively thick spacers 74, 78 and 82, the intervening spacer 78 is provided with an outwardly extending lug 78b for holding the flat coil 22. With such a configuration, this embodiment achieves advantages comparable with those of the previous embodiment.

In summary, it will be seen that the present invention provides a magnetic disk drive which is free from the thermal off-track problem since it affixes load springs carrying head sliders directly to spacers, forms the spacers out of the same material as the load springs, and forms the spacers out of at least two different materials.

Various modifications will become possible for those skilled in the art after receiving the teachings of the present disclosure without departing from the scope thereof.

What is claimed is:

1. A magnetic disk drive for writing and reading data out of a plurality of magnetic disks, comprising:

a magnetic head assembly comprising a plurality of data head sliders disposed individually facing respective faces of associated magnetic disks for writing and reading data out of said disks, and a plurality of servo head sliders for positioning associated data head sliders;

a plurality of gimbal springs each having a tongue for supporting one of said data head sliders and said servo head sliders;

a plurality of load springs each carrying an associated one of said gimbal springs at a first end thereof while causing said one gimbal spring to face an adjoining face of one of said disks, said load springs being respectively formed with coaxial holes at a second end for receiving a center shaft of a rotary carriage, said load springs being integrally affixed to said rotary carriage with said coaxial holes directly receiving said center shaft of said shaft of said rotary carriage; and a plurality of discrete spacers, distinct from said load springs, for maintaining constant separation distances between adjacent load springs, said spacers defining coaxial holes for receiving said center shaft of said rotary carriage, and said spacers being made of a material having a different coefficient of thermal expansion than a material of which said load springs are made.

2. A magnetic disk drive as claimed in claim 1, wherein at least one of said spacers is made of a material different in coefficient of linear expansion from a material of the other spacers.

3. A magnetic disk drive for writing and reading data out of a plurality of magnetic disks, comprising:

a magnetic head assembly comprising a plurality of data head sliders disposed individually facing respective faces of associated magnetic disks for writing and reading data out of said disks, and a plurality of servo head sliders for positioning associated data head sliders;

a plurality of load springs each carrying an associated one of said data head sliders and said servo head sliders at a first end thereof while causing said one head slider to face an adjoining face of one of said disks, said load springs being respectively formed with coaxial holes for receiving a center shaft of a rotary carriage, said load springs being integrally affixed to said rotary carriage with said coaxial holes directly receiving said center shaft of said rotary carriage; and a plurality of discrete spacers, distinct from said load springs, for maintaining constant separation distances between adjacent load springs, said spacers defining coaxial holes for receiving said center shaft of said rotary carriage, and said spacers being made of a material having a different coefficient of thermal expansion than a material of which said load springs are made.

4. A magnetic disk drive as claimed in claim 3, wherein at least one of said spacers is made of a material different in coefficient of linear expansion from a material of the other spacers.

* * * * *